US006763399B2

(12) United States Patent
Margalit et al.

(10) Patent No.: US 6,763,399 B2
(45) Date of Patent: Jul. 13, 2004

(54) USB KEY APPARATUS FOR INTERACTING WITH A USB HOST VIA A USB PORT

(75) Inventors: Yanki Margalit, Ramat Gan (IL); Dany Margalit, Ramat Gan (IL); Rami Kastershtien, Tel Aviv (IL)

(73) Assignee: Aladdin Knowledge Systems, Ltd., Tel Aviv (IL)

( * ) Notice: Subject to any disclaimer, the term of this patent is extended or adjusted under 35 U.S.C. 154(b) by 21 days.

(21) Appl. No.: 10/126,520

(22) Filed: Apr. 22, 2002

(65) Prior Publication Data

US 2004/0073726 A1 Apr. 15, 2004

Related U.S. Application Data

(63) Continuation of application No. 09/189,960, filed on Nov. 10, 1998, now abandoned.

(51) Int. Cl.[7] .......................... G06F 1/00; G06F 13/00; H04L 9/10
(52) U.S. Cl. .............................. 710/13; 710/8; 710/63; 710/103; 713/200; 713/202; 713/185
(58) Field of Search ............................... 710/8, 13, 63, 710/103; 713/200, 202, 185

(56) References Cited

U.S. PATENT DOCUMENTS 6,151,647 A * 11/2000 Sarat .......................... 710/301
6,168,077 B1 * 1/2001 Gray et al. ................... 235/375
6,216,230 B1 * 4/2001 Rallis et al. .................. 713/185

FOREIGN PATENT DOCUMENTS

| EP | 0554164 A1 | 8/1993 | .......... G06K/7/00 |
| EP | 0848315 A2 | 6/1998 | .......... G06F/1/00 |
| WO | WO 94/10773 | 5/1994 | .......... H04K/1/00 |

OTHER PUBLICATIONS

P. Guelle, "Un Dongle A Puce De Telecarte" Electronique Radio Plans, Nov. 1991, No. 528, pp 75–78.
Wibu–Key, Users guide version 2.50, Jul. 1998, WIBU–Systems AG pp. 12–16; 25–28; 153–154 & 163–164.

* cited by examiner

Primary Examiner—Jeffrey Gaffin
Assistant Examiner—Tammara Payton
(74) Attorney, Agent, or Firm—Mark M. Friedman

(57) ABSTRACT

A smart card—host system that operates without the intermediation of a smart card reader. The smart card—host system comprises a host, which has a USB interface, and a portable device, which provides smart card function(s). The portable device has a smart card chip for performing the smart card function(s); a USB interface for connecting the portable device with the host via USB protocol; and a microprocessor for controlling the transfer of data between the USB interface and the smart card chip, for converting data from a USB format to the format of the smart card chip and for converting data from the format of the smart card chip to a USB format.

27 Claims, 2 Drawing Sheets

USB KEY APPARATUS FOR INTERACTING WITH A USB HOST VIA A USB PORT

The present application is a Continuation application based on the parent patent application 09/189,960 filed Nov. 10, 1998 now abandoned.

FIELD OF THE INVENTION

The present invention relates to USB (Universal serial bus) apparatus and methods for using USB hosts.

BACKGROUND OF THE INVENTION

The USB interface is described in specifications available over the Internet at www.usb.org.

Conventional devices for providing computerized servicing to a mobile or stationary population of users typically include a smart card reader. The members of the mobile population bear smart cards which are used to interact with the computerized servicing device via the smart card reader.

A particular disadvantage of smart cards is that they require a smart card reader which is a relatively costly device. Computer hosts which are equipped with a smart card reader are a small subset of the universe of computer hosts because addition of a smart card reader makes the computer considerably more expensive.

German Patent document DE 19631050 describes an interface converter for a universal serial bus having a module with processor that changes format and protocol into that of a different bus system.

The disclosures of all publications mentioned in the specification and of the publications cited therein are hereby incorporated by reference.

SUMMARY OF THE INVENTION

The present invention seeks to provide improved USB apparatus and improved methods for using the same.

There is thus provided, in accordance with a preferred embodiment of the present invention, USB key apparatus for interacting with a USB host via a USB port, the USB key apparatus including a portable device configured to fit the USB port, the portable device including a USB interface conveying USB communications to and from a USB host, a protocol translator operative to translate the USB communications from USB protocol, into smart card protocol such as an ISO7816 protocol, and from smart card protocol into USB protocol and a smart card chip operative to perform at least one smart card function such as authentication, encryption, access control and secure memory.

Also provided, in accordance with another preferred embodiment of the present invention, is USB key apparatus with data storage capabilities, the USB key apparatus including a portable device such as a PCB, configured to fit the USB port, the portable device including a USB interface conveying USB communications to and from a USB host and a data storage unit storing information derived from the USB communications.

Preferably the apparatus also includes a microprocessor operative to receive said USB communications from the USB interface, to perform computations thereupon and to provide results of the computations to the data storage unit for storage and/or for encryption and/or for authentication and/or for access control.

The term "USB port" refers to a port for connecting peripherals to a computer which is built according to a USB standard as described in USB specifications available over the Internet at www.usb.org.

The term "USB key" or "USB token" refers to a hardware device whose circuitry interfaces with a USB port to perform various functions.

The term "smart card" refers to a typically plastic card in which is embedded a chip which interacts with a reader, thereby allowing a mobile bearer of the smart card to interact with a machine in which is installed a smart card reader, typically with any of a network of machines of this type.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
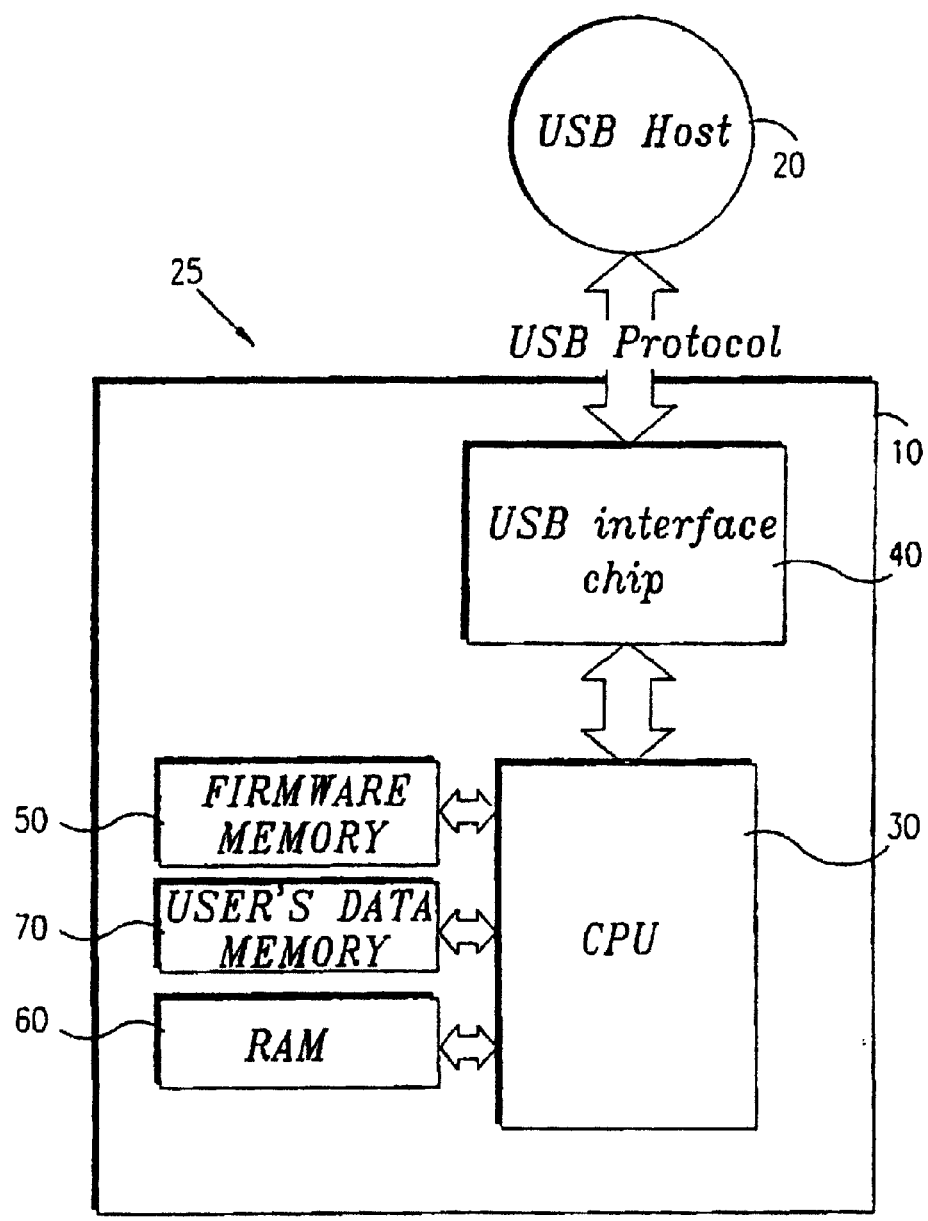
FIG. 1 is a simplified block diagram of a USB key device including a CPU and a non-ISO7816 memory, the USB device being constructed and operative in accordance with a preferred embodiment of the present invention.

Reference is now made to FIG. 1 which is a simplified block diagram of a USB key device including a CPU and a non-ISO7816 memory, the USB device being constructed and operative in accordance with a preferred embodiment of the present invention.

A particular feature of the USB key device of FIG. 1 is that it has data storage capabilities and is thus analogous to a memory card.

The USB key device 10 comprises a PCB 25 which includes a microprocessor or CPU 30 such as a Motorola 6805, Cypress chip or Intel 8051; a USB interface device 40; firmware memory 50 serving the firmware of the microprocessor 30; RAM memory 60 of size sufficient to enable contemplated computations on the part of the microprocessor 30; and user data memory 70 which stores a user's data. Some or all of the USB interface device 40, firmware memory 50 and RAM memory 60 may be within the CPU 30.

The USB interface device 40 and/or the firmware memory 50 may be integrated inside the microprocessor 30.

The firmware memory may be any suitable type of memory such as but not limited to ROM, EPROM, EEPROM or FLASH.

The user data memory 70 typically does not include ISO7816-3 memory and may, for example, comprise any of the following types of memory: I²C, XI²C, ⅔ wire bus, FLASH.

As shown, the USB key device 10 is configured to interact with any USB host 20 such as but not limited to a personal computer or Macintosh having a USB port. Key-host interaction is governed by a USB protocol such as the USB protocol described in the USB specifications available over the Internet at www.usb.org. USB packets pass between the USB host 20 and the USB interface chip 40. Each packet typically includes the following components:

a. USB header;

b. Data to be stored/read on the user's data memory 70, plus additional information required by protocols of the memory chip 70, such as but not limited to the address to store/read the data, the length of data to store/read, and CRC checksum information.

c. USB footer.

The flow of data typically comprises the following flow:

The USB interface chip 40 receives USB packets from the USB host 20, parses the data, and feeds the parsed data to the microprocessor 30. The microprocessor 30 writes the data to, or reads the data from, the firmware memory 50, the RAM 60 or the user's data memory 70, using each memory's protocol.

In read operation, the microprocessor 30 passes the data to the USB interface chip 40 which wraps the data in USB packet format and passes it to the host 20.

Figure 2:
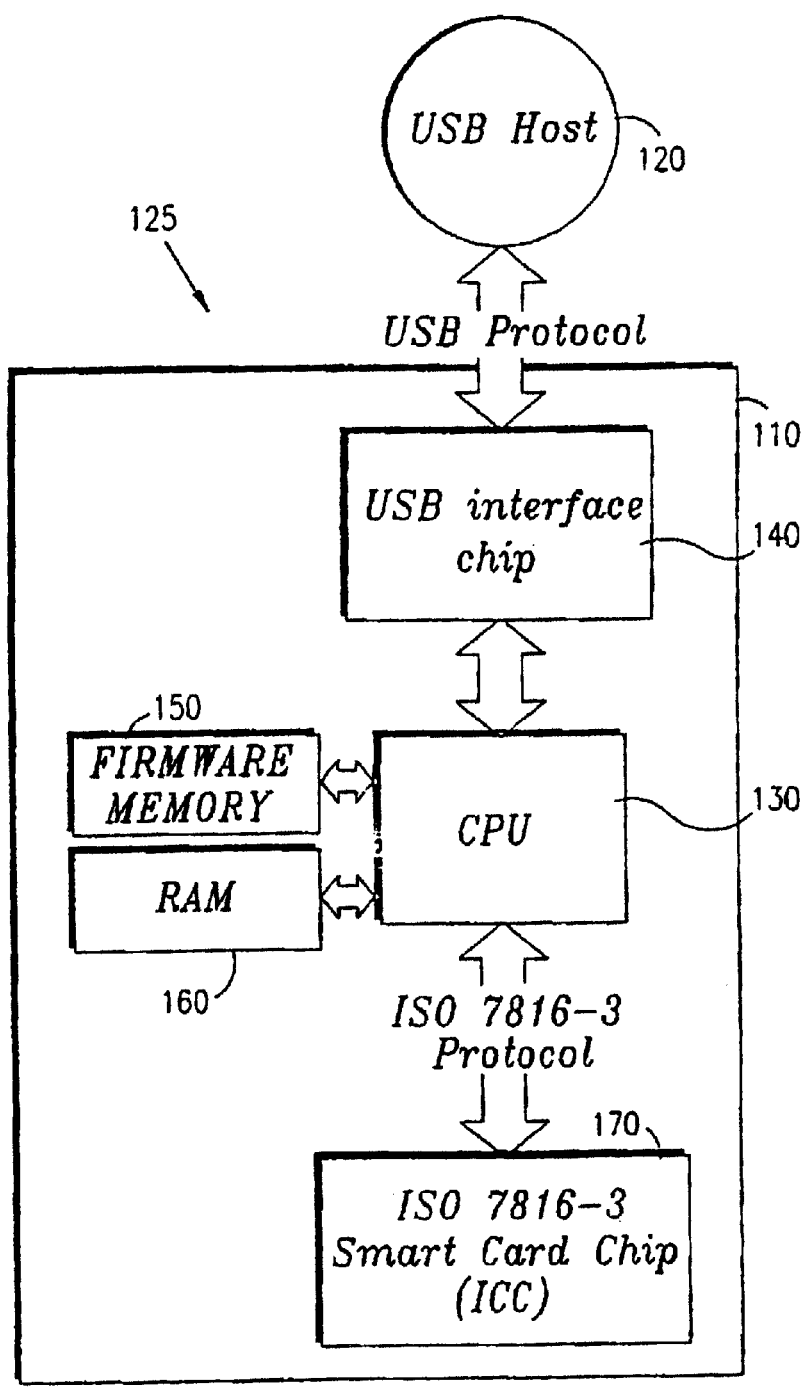
FIG. 2 is a simplified block diagram of a USB key device including a CPU and a ISO7816 memory, the USB device constructed and operative in accordance with a preferred embodiment of the present invention.

FIG. 2 is a simplified block diagram of a USB key device, constructed and operative in accordance with a preferred embodiment of the present invention, which is a one-piece smart card reader and smart card chip preferably providing both secured storage and cryptographic capabilities. The USB key device of FIG. 2 includes both a CPU and a smart card chip (ICC) memory 170, typically a ISO7816 (T=0/1) protocol-based chip communicating with the CPU 130 using an ISO7816-3 protocol. The apparatus of FIG. 2 is similar to the apparatus of FIG. 1 except that no separate user's data memory 70 is provided. The size of the RAM 160 is typically at least 262 bytes in order to support the ISO 7816_3 T=0 or T=1 protocols.

Each packet typically includes the following components:

a. USB header;

b. ISO7816-3 T=0/1 protocol packet;

c. USB footer.

The flow of data in the apparatus of FIG. 2 typically comprises the following flow:

The USB interface chip 140 gets USB packets from the USB host 120. The USB interface chip 140 parses the data and passes it to the microprocessor 130. The data, which typically comprises a ISO7816-3 T=0/1 formatted packet, is passed by the microprocessor to the smart-card 170 in a ISO7816-3 protocol. The microprocessor 130 gets the response from the smart card 160 and passes the data to the USB interface chip 140. The USB interface chip 140 wraps the data in USB packet format and passes it to the host 120.

A particular advantage of the embodiment of FIG. 2 is that smart card functionality is provided but there is no need for a dedicated reader because the key 110 is connected directly to a USB socket in the host 120.

The invention shown and described herein is particularly useful for computerized systems serving organizations which process sensitive information such as banks, insurance companies, accountants and other commercial organizations, and professional organizations such as medical or legal organizations.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A smart card—host system, wherein a portable device communicates directly with a USB interface of a host, said smart card—host system comprising:

a host, having thereon a USB interface;

a portable device, for providing smart card function(s), said portable device having thereon a smart cart chip, for performing said smart card function(s), a USB interface, for connecting said portable device with said host via USB protocol; and a microprocessor, for enabling at least one function selected from the group consisting of controlling the transfer of data between said USB interface and said smart card chip, for converting data from a USB format to the format of said smart card chip and for converting data from the format of said smart card chip to a USB format.

2. A system according to claim 1, wherein said portable device consists of at least one substrate having thereon said smart chip, said USB interface, and said microprocessor.

3. A system according to claim 1, wherein said portable device is a USB key operative as a component into which said smart card chip, said USB interface, and said microprocessor are placed.

4. A system according to claim 1, wherein said portable device further comprises data storage means for at least one function selected from the group consisting of storing data required for the operation of said microprocessor and storing data required for the operation of said smart card chip.

5. A system according to claim 1, wherein said portable device further comprises secured memory.

6. A system according to claim 1, wherein said system is operative to perform at least one function selected from the group consisting of cryptography, authentication, encryption, public key infrastructure, digital signature, RSA and access control.

7. A system according to claim 1, wherein said supports ISO7816 standard.

8. A portable smart card apparatus for providing smart card function(s) to a host system, by communicating directly with a USB interface of the host system, said smart card apparatus comprising:

a smart card chip, for performing said smart card function(s);

a USB interface, for connecting the portable device apparatus with the host system, via USB protocol; and a microprocessor, for enabling at least one function selected from the group consisting of controlling the transfer of data between said USB interface and said smart card chip, converting data from a USB format to the format of said a smart card chip and converting data from the format of said smart card chip to a USB format.

9. An apparatus according to claim 8, wherein said portable device consists of at least one substrate having thereon said smart chip, said USB interface, and said microprocessor.

10. An apparatus according to claim 8, wherein said portable device is a USB key operative as a component into which said smart card chip, said USB interface, and said microprocessor are placed.

11. An apparatus according to claim 8, wherein said portable device further comprises data storage means, for storing data required for the operation of at least one element selected from the group consisting of said microprocessor and said smart card chip.

12. An apparatus according to claim 8, wherein said portable device further comprises secured memory.

13. An apparatus according to claim 8, wherein said apparatus is operative to perform at least one function selected from the group consisting of cryptography, authentication, encryption, public key infrastructure, digital signature, RSA and access control.

14. An apparatus according to claim 8, wherein said apparatus supports ISO7816 standard.

15. A method for interacting directly between a smart card chip and a host via a USB interface of the host, comprising the steps of:
   coupling the host with a USB interface, for interacting with an external device via USB protocol;
   providing a portable external device, for being used as a platform for said smart card chip, said portable device having thereon a USB interface, for interacting with the host via USB protocol; and a microprocessor, for executing at least one function selected from the group consisting of controlling the transfer of data between said USB interface and said smart card chip, converting data from a USB format to the format of said smart card chip and converting data from the format of said smart card chip to a USB format;
   upon receiving data in the USB interface of said portable device, converting said data from a USB format of said smart card by said microprocessor, and conveying the converted data to said smart card chip; and
   upon sending data from said smart card chip to the host, converting said data from the format of said smart card chip to said USB format by said microprocessor, conveying the converted data to said USB interface of said portable device, and there from to the host, via the host's USB interface.

16. A method according to claim 15, wherein said portable device consists of at least one substrate having thereon said smart chip, said USB interface, and said microprocessor.

17. A method according to claim 15, wherein said portable device is a USB key operative as a component into which said smart card chip, said USB interface, and said microprocessor are placed.

18. A method according to claim 15, wherein said portable device further comprises data storage means, for storing data required for operating at least one component selected from the group consisting of microprocessors and smart card chips.

19. A method according to claim 15, wherein said portable device further comprises secured memory.

20. A method according to claim 15, wherein said method is operative to perform at least one function selected from the group consisting of cryptography, authentication, encryption, public key infrastructure, digital signature, RSA and access control.

21. A method according to claim 15, wherein said portable device supports ISO7816 standard.

22. A system according to claim 1, wherein said smart chip is operationally connected directly to said microprocessor.

23. A system according to claim 22, wherein said smart chip is operationally connected directly to said microprocessor on a common substrate.

24. An apparatus according to claim 8, wherein said smart chip is operationally connected directly to said microprocessor.

25. A system according to claim 24, wherein said smart chip is operationally connected directly to said microprocessor on a common substrate.

26. A method according to claim 15, wherein said smart chip is operationally connected directly to said microprocessor.

27. A system according to claim 26, wherein said smart chip is operationally connected directly to said microprocessor on a common substrate.

* * * * *